United States Patent [19]

Khoe et al.

[11] Patent Number: 4,784,466
[45] Date of Patent: Nov. 15, 1988

[54] OPTICAL TRANSMISSION SYSTEM COMPRISING A RADIATION SOURCE AND A MULTIPLECLAD MONOMODE OPTICAL TRANSMISSION FIBRE WITH A NEGATIVE-STEP INDEX PROFILE

[75] Inventors: Giok D. Khoe, Eindhoven, Netherlands; Peter K. Bachmann, Aachen, Fed. Rep. of Germany

[73] Assignee: U.S. Philips Corp., New York, N.Y.

[21] Appl. No.: 908,463

[22] Filed: Sep. 17, 1986

[30] Foreign Application Priority Data

Sep. 26, 1985 [NL] Netherlands .......................... 8502625

[51] Int. Cl.$^4$ ........................... G02B 6/22; G02B 6/26
[52] U.S. Cl. ............................... 350/96.33; 350/96.15; 350/96.18
[58] Field of Search ............... 350/96.15, 96.30, 96.33, 350/96.18

[56] References Cited

U.S. PATENT DOCUMENTS

| | | | |
|---|---|---|---|
| 4,143,940 | 3/1979 | Khoe | 350/96.15 |
| 4,243,399 | 1/1981 | Khoe et al. | 350/96.18 X |
| 4,252,403 | 2/1981 | Salisbury | 350/96.15 |
| 4,370,021 | 1/1983 | Khoe et al. | 350/96.18 |
| 4,440,470 | 4/1984 | Khoe | 350/96.18 |
| 4,601,535 | 7/1986 | Tanaka et al. | 350/96.15 |
| 4,701,011 | 10/1987 | Emkey et al. | 350/96.18 |

FOREIGN PATENT DOCUMENTS 2116744  9/1983  United Kingdom .

OTHER PUBLICATIONS

"Electronics Letters", Mar. 17, 1983, vol. 19, No. 6, pp. 205-207.
The Bell System Technical Journal, May-Jun. 1977, pp. 703-718-Loss Analysis of Single-Mode Fiber Splices.
Journal of Lightware Technology, vol. LT-2, No. 3, Jun. 1984, pp. 217-227: Progress in Monomode Optical-Fiber Interconnection Devices.
Applied Optics, vol. 19, No. 15, pp. 2578-2583/Aug. 1, 1980, Efficient Coupling from Semiconductor Lasers into Single-Mode Fibers with Tapered Hemispherical Ends.

Primary Examiner—William L. Sikes
Assistant Examiner—Akm E. Ullah
Attorney, Agent, or Firm—William L. Botjer

[57] ABSTRACT

An optical transmission system is described which comprises a radiation source (30) and a multiple-clad monomode optical transmission fibre (10) with a negative-step index profile. In order to improve the efficiency of coupling the radiation from the source into the transmission fibre a single-clad-monomode transmission fibre (20), whose end portion which faces the source is tapered, is arranged between the source and said fibre.

6 Claims, 1 Drawing Sheet

OPTICAL TRANSMISSION SYSTEM COMPRISING A RADIATION SOURCE AND A MULTIPLECLAD MONOMODE OPTICAL TRANSMISSION FIBRE WITH A NEGATIVE-STEP INDEX PROFILE

FIELD OF THE INVENTION

Background of the Invention

The invention relates to an optical transmission system comprising a radiation source and a multiple-clad monomode optical transmission fibre with a negative-step index profile.

Such a fibre differs from more conventional fibres in that the cladding does not comprise a single layer but a plurality of layers having mutually different refractive indices. The refractive index profile of the fibre is a curve representing the variation of the refractive index in a radial direction. A negative step in the refractive index profile means that one of the cladding layers has a lower refractive index than the nearest cladding layer surrounding it.

British Patent Application No. 2,116,744, which has been laid open to public inspection, describes a quadruple-clad monomode transmission fibre whose cladding comprises four layers having different refractive indices. At least one of the layers has a refractive index which is lower than the refractive index of the layer surrounding it. In comparison with a conventional monomode fibre comprising a single-layer cladding, such a fibre has the advantage that the chromatic dispersion remains low over a larger wavelength range. As a result of this, said fibre has a higher transmission capacity than a conventional monomode transmission fibre. The transmission capacity is the amount of information that can be transmitted per unit of time.

A familar problem encountered when using optical transmission fibres is the low coupling efficiency, i.e. the fraction of the radiation emitted by the radiation source which is not transmitted by the transmission fibre. As is known, inter alia from the article "Efficient coupling for semiconductor lasers into single-mode fibres with hemispherical ends" in "Applied Optics", Vol. 19, No. 15, pages 2578-2583, August 1980, the coupling efficiency of a single-clad monomode optic transmission fibre can be improved if the core and suitably also the cladding are tapered at the fibre end portion.

When this measure is applied to, for example, a quadruple-clad monomode transmission fibre this often does not yield the anticipated increase in coupling efficiency. Measurements on a quadruple-clad transmission fibre having a tapered end portion reveal that the coupling efficiency is only half the coupling efficiency of a single-clad monomode transmission fibre having a tapered end portion. It has been found that as the diameters of the fibre core and cladding are reduced the fundamental mode is decreasingly confined to the core and leaks out of the fibre. This prohibits an efficient transmission of radiation from the light source to the straight part of the quadrupleclad optical transmission fibre. The above effect may occur in any fibre whose refractive index profile exhibits a negative step.

It is the object of the present invention to provide an optical transmission system in which the radiation is coupled from the source into such a fibre with an optimum efficiency.

To this end the optical transmission system in accordance with the invention is characterized in that a single-clad monomode optical transmission fibre, whose end portion which faces the radiation source has a tapered core, is arranged between the multiple-clad monomode optical transmission fibre and the radiation source.

The coupling efficiency can be optimized by a suitable choice of the parameters of the tapered end portion of the single-clad monomode transmission fibre.

The invention is characterized further in that the spot size at the straight end of the single-clad transmission fibre is substantially equal to the spot size of the multiple-clad optical transmission fibre.

As is stated in the article "Loss Analysis of Single Mode Fibre Splices" by D. Marcuse in "The Bell System Technical Journal" 1977, pages 703-718, the radiation field of a monomode transmission fibre bears much resemblance to a Gaussian intensity distribution. Therefore, it is possible to assign a mode spot to such a fibre, which spot is characterized by a spot diameter 2W. W is the distance between the point of maximum intensity within the spot and the point where the intensity has decreased to $1/e^2$ of the maximum value. The mode-spot diameter 2W is the principal parameter in the case of coupling into a monomode transmission fibre. The desired spot size of the single-clad monomode transmission fibre, adapted to the spot size of the multiple-clad monomode transmission fibre, can be obtained by a suitable choice of the difference in refractive index between core and cladding materials and of the core diameter, as is described in said article by D. Marcuse.

In order to obtain a further increase in coupling efficiency the transmission system may be characterized further in that a lens system is interposed between the radiation source and the tapered end portion of the single-clad monomode transmission fibre.

In accordance with a further characteristic feature said lens system suitably comprises a transparent material which is applied to the end of the single-clad monomode transmission fibre and which has a spherical outer surface.

It is to be noted that such a tapered monomode transmission fibre with integrated lens is known per se from the article "Efficient coupling of laser diodes to tapered monomode fibers with high-index end" in "Electronics Letters" Vol. 19, No. 6, March 1983, pages 205-207. However, in the device described in said article the single-clad monomode transmission fibre is not combined with a quadruple-clad monomode transmission fibre.

BRIEF DESCRIPTION OF THE INVENTION

In a first embodiment the transmission system comprising a single-clad tapered monomode transmission fibre with integrated lens is characterized in that the refractive index of the lens material is higher than that of the core material of the single-clad monomode optical transmission fibre.

In a second embodiment this transmission system is characterized further in that the lens material has a refractive index which is substantially equal to that of the core material and in that the lens material has a melting temperature which is lower than that of the transmission fibre materials.

This second embodiment has the advantage that reflections from the transitions between the lens material and the fibre material are minimal, because the refractive indices of the materials are substantially equal.

DESCRIPTION OF THE DRAWINGS

Embodiments of the invention will now be described in more detail, by way of example, with reference to the accompanying drawing, in which.

DESCRIPTION OF THE PREFERRED EMBODIMENT

Figure 1A:
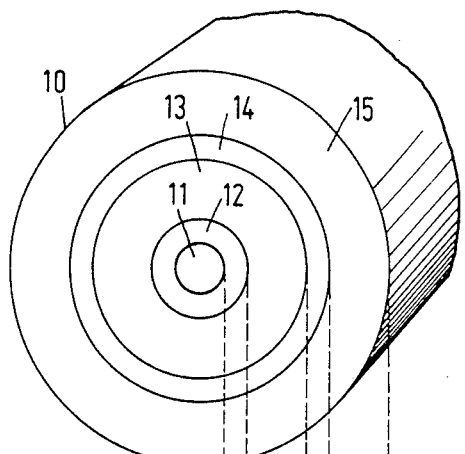
FIG. 1 shows a known quadruple-clad optical transmission fibre.
Figure 1B:
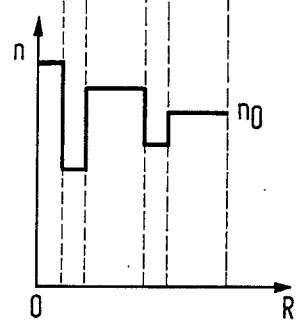

FIG. 1a is a schematic sectional view of the quadrupleclad transmission fibre 10 comprising a core 11 and four cladding layers 12, 13, 14 and 15. FIG. 1b represents the variation of the refractive index of such a fibre as a function of the radius. A suitable choice of the radii and refractive indices of the core and the cladding layers ensures that the fibre 10 has a low chromatic dispersion over a comparatively wide range of wavelengths. The comparatively low coupling efficiency of such a fibre is improved by the invention.

Figure 2:
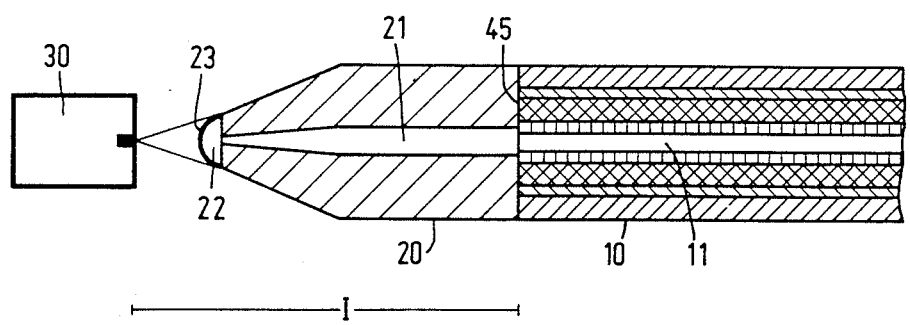
FIG. 2 shows an optical transmission system in accordance with a preferred embodiment of the invention.

The optical transmission system in accordance with the invention shown in FIG. 2 comprises a light source 30, for example a diode laser or a light-emitting diode. The radiation emitted by the source is coupled into the core 11 of the quadruple-clad monomode transmission fibre 10 via a coupling path I, said fibre 10 forming the beginning of a long-distance transmission system. The coupling path I comprises a single-clad monomode optical transmission fibre 20 of the single-step-index type, i.e. the cladding of this fibre has only one refractive index. Since the core 21 of this fibre is tapered at the end facing the light source, this fibre exhibits a high coupling efficiency. A further increase in coupling efficiency can be obtained by arranging a lens 22 on the tapered end portion, for example in a manner as described in said article in "Electronics Letters" Vol. 19, pp. 205–207. The lens 22 may be provided with an anti-reflection coating 23. The refractive index of the lens material may be substantially higher than the refractive index of the core material of the fibre 20 in order to obtain a large numerical aperture. Alternatively, the lens may be made of a material whose refractive index is substantially equal to the refractive index of the core material but whose melting point is substantially lower than that of the core material. When the lens 22 is attached care must be taken that the core material of the fibre 20 is not softened.

The radiation transmitted by the transmission fibre 20 is transferred to the multiple-clad fibre 10 at the location 45. Care is taken that the spot diameters at the ends of the fibres 20 and 10 are equal to each other insofar as possible. In one embodiment the cladding of the fibre 20 is therefore made of a material having a refractive index which is approximately 1% smaller than the refractive index of the core material of this fibre.

Suitably, the refractive indices of the core materials of the fibres 20 and 10 are equal to each other as far as possible, so as to minimize reflections from the transition between the fibre 20 and the fibre 10.

The mechanical coupling of the fibre 20 to the fibre 10 can be established in known manner, for example as described in the article "Progress in Monomode Optical Fibre Interconnection Devices", in "Journ. of Lightwave Techn." Vol. LT 2, June 1984, pp. 217–227.

What is claimed is:

1. An optical transmission system comprising a radiation source; a multiple-clad monomode optical transmission fibre with a negative-step index profile; and a single-clad monomode optical transmission fibre, having a tapered core characterized by a first refractive index, arranged between the multiple-clad monomode optical transmission fibre and the radiation source.

2. An optical transmission system as claimed in claim 1, wherein the single clad fibre and the multiple clad fibre are characterized by a substantially equal spot size at an interface therebetween.

3. An optical transmission system as claimed in claim 1 or 2, further comprising a lens system interposed between the radiation source and the single-clad monomode optical transmission fibre.

4. An optical transmission system as claimed in claim 3, wherein the lens system comprises a transparent material which is applied to one end of the single-clad monomode optical transmission fibre and which has a spherical outer surface.

5. An optical transmission system as claimed in claim 4, wherein the lens material is characterized by a higher refractive index than the refractive index of the core material of the single-clad monomode optical transmission fibre.

6. An optical transmission system as claimed in claim 4, wherein the lens material has a refractive index which is substantially equal to the refractive index of the core material and in that the lens material has a melting temperature which is lower than that of the transmission fibre material.

* * * * *